US012574878B2

(12) United States Patent
Sharma et al.

(10) Patent No.: US 12,574,878 B2
(45) Date of Patent: Mar. 10, 2026

(54) NETWORK DEVICE AND METHOD OF PREVENTING TIMING LOOP

(71) Applicant: UFI SPACE CO., LTD., New Taipei City (TW)

(72) Inventors: Lokesh Sharma, New Taipei City (TW); Ching-Chun Lee, New Taipei City (TW); Yu-Chi Hui, New Taipei City (TW)

(73) Assignee: UFI SPACE CO., LTD., New Taipei City (TW)

( * ) Notice: Subject to any disclaimer, the term of this patent is extended or adjusted under 35 U.S.C. 154(b) by 519 days.

(21) Appl. No.: 18/098,133

(22) Filed: Jan. 18, 2023

(65) Prior Publication Data

US 2024/0172153 A1 May 23, 2024

(30) Foreign Application Priority Data

Nov. 17, 2022 (TW) ................................. 111144028

(51) Int. Cl.
*H04W 56/00* (2009.01)
*H04J 3/06* (2006.01)
*H04L 45/18* (2022.01)

(52) U.S. Cl.
CPC ......... *H04W 56/004* (2013.01); *H04J 3/0658* (2013.01); *H04L 45/18* (2013.01); *H04W 56/009* (2013.01)

(58) Field of Classification Search
CPC ..................... H04J 3/0635–0697; H04L 45/18
See application file for complete search history.

(56) References Cited

U.S. PATENT DOCUMENTS 6,185,216 B1 * 2/2001 Chapman .............. H04J 3/0679
370/402
2016/0065322 A1 3/2016 Cao et al.

FOREIGN PATENT DOCUMENTS

JP 2005269369 A 9/2005
WO WO-2017130034 A1 * 8/2017
WO WO-2022166473 A1 * 8/2022 ............ H04J 3/0641

OTHER PUBLICATIONS

IEEE 1588-2019 IEEE Standard for a Precision Clock Synchronization Protocol for Networked Measurement and Control Systems, IEEE Std 1588-2019, The Institute of Electrical and Electronics Engineers, Inc., New York, N.Y., USA, Jun. 16, 2020 (Year: 2020).*
Office Action dated May 30, 2023 of the corresponding Taiwan patent application No. 111144028.

* cited by examiner

*Primary Examiner* — Charles C Jiang
(74) *Attorney, Agent, or Firm* — HDLS IPR SERVICES; Chun-Ming Shih

(57) ABSTRACT

A method of preventing a timing loop and a network device are provided. The method of preventing the timing loop includes receiving a source synchronization packet by a network device; retrieving key data of the source synchronization packet; determining whether the key data of the source synchronization packet includes an identifier of the network device if the network device is determined including at least two inputs and one output; generating a local synchronization packet and adding the identifier of the network device to the key data of the local synchronization packet when determining that the key data of the source synchronization packet does not include the identifier; and, sending the local synchronization packet through the output.

10 Claims, 7 Drawing Sheets

NETWORK DEVICE AND METHOD OF PREVENTING TIMING LOOP

BACKGROUND OF THE DISCLOSURE

Technical Field

The disclosure generally relates to the field of a communication device and a communication method, and more particularly, to the field of a communication device and a communication method of preventing a timing loop.

Description of Related Art

In the Ethernet, specific protocol packets are implemented among a plurality of Network Elements (NEs) to achieve the clock synchronization among the NEs.

Reference is made to FIG. 1. FIG. 1 is a block diagram illustrating an example of a plurality of network devices forming a timing loop in the Ethernet. The clock source 100 depicted in FIG. 1 is, for example, the Primary Reference Time Clock (PRTC) or the Telecom Grandmaster (T-GM) defined by the standard organization ITU-T G.8272. The NE 222 receives the PRTC signal from the clock source 100 and locks the clock signal to be the local clock of the NE 222. The NE 222 transmits the clock signal to the NE 224, so the NE 224 may use the clock signal to update the local clock itself. Eventually, the clock signal that is transmitted by the NE 226 to the NE 222 is previously transmitted from the NE 222. In other words, the timing loop 280 exists in the Ethernet.

One current solution to the timing loop 280 is depicted in FIG. 2.

Reference is made to FIG. 2. FIG. 2 is a block diagram illustrating an example of signal transmission for preventing forming the timing loop of FIG. 1. In the synchronization network architecture, the packet includes the Synchronization Status Message (SSM), and the Quality Level of the SSM represents different synchronization signal quality. As shown in FIG. 2, the NE 226 transmits the clock signal 270 to the NE 222. Because the source of the clock signal is the NE 222 as described above, the NE 222 transmits the synchronous status message QL_DNU with the quality level of "DO NOT USE" to the NE 226. After the NE 226 receives the synchronous status message QL_DNU, the NE 226 gets the information that the NE 222 cannot use the clock signal 270. In this scenario, the clock signal 270 is not used for the clock synchronization, so the timing loop is prevented.

Another current solution to the timing loop is implemented by the Ethernet Synchronization Message Channel (ESMC) in the Ethernet. The Type Length Value (TLV) of the protocol data unit (PDU) of the ESMC uses the reserved bits. The reserved bits store the clock source identifier (clock-source ID). The clock source identifier indicates the clock source, so the clock source identifier can be used to prevent the timing loop in the Ethernet.

Reference is made to FIG. 3. FIG. 3 is a block diagram illustrating an example of a plurality of network devices forming the timing loop in the Ethernet. The NE 222 receives the signal of the clock source 100. Because the NE 222 receives the signal of the clock source 100 directly, the NE 222 sets its clock source identifier as ID:1. The NE 222 then transmits the signal carrying the clock source identifier ID:1 to the NE 224. Because there is no other clock source in the network, both the NE 224 and the NE 226 transmit the signal carrying the clock source identifier ID:1. In the network architecture, the NE 222 gets the information that the clock signal is transmitted by itself according to the clock source identifier ID:1, so the NE 222 does not use the clock source for synchronizing the local clock. The solution of using the clock source identifier prevents the timing loop when the NE 222 determines that the clock source identifier indicates its ID.

The solution yet induces another problem. The length of the reserved bits is 4 bits, so only 16 clock sources can be stored. When the number of the NEs in the Ethernet is too large (e.g., more than 16), the reserved bits cannot store all the clock sources, such that the solution of preventing the timing loop is not effective.

On the other hand, please refer back to FIG. 3, the NE 262 connects with two sub-networks. The NE 262 receives the clock source identifier ID:1 from the left sub-network. Similarly, all the NE 262, the NE 264, and the NE 266 transmit the signals carrying the clock source identifier ID:1. In other words, the NE 262 receives the signal from the NE 266. The clock source identifier ID:1 is not the clock source identifier of the NE 262 though, the NE 262 cannot detect the timing loop 290. The solution of using the clock source identifier still causes the timing loop problem.

Accordingly, how to prevent the timing loop in the Ethernet is the technical problem to be solved in the present disclosure.

SUMMARY OF THE DISCLOSURE

The disclosure can be more fully understood by reading the following detailed description of the embodiments, with reference made to the accompanying drawings as described below. It should be noted that the features in the drawings are not necessarily to scale. In fact, the dimensions of the features may be arbitrarily increased or decreased for clarity of discussion.

The present disclosure of an embodiment provides a method of preventing timing loop including: receiving a source synchronization packet by a network device; retrieving key data of the source synchronization packet; determining whether the key data of the source synchronization packet includes an identifier of the network device if the network device is determined to include at least two inputs and one output; generating a local synchronization packet and adding the identifier of the network device to the key data of the local synchronization packet when determining that the key data of the source synchronization packet does not include the identifier; and sending the local synchronization packet through the output.

The present disclosure of an embodiment provides a network device including a communication interface and a processor. The communication interface is configured to receive a source synchronization packet. The processor is connected with the communication interface, and the processor is configured to: retrieve key data of the source synchronization packet; determine whether the key data of the source synchronization packet includes an identifier of the network device if the network device is determined to include at least two inputs and one output; generate a local synchronization packet and add the identifier of the network device to the key data of the local synchronization packet when determining that the key data of the source synchronization packet does not include the identifier; and sending the local synchronization packet through the output.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as described below.

It should be noted that the features in the drawings are not necessarily to scale. The dimensions of the features may be arbitrarily increased or decreased for clarity of discussion.

DETAILED DESCRIPTION

Figure 1:
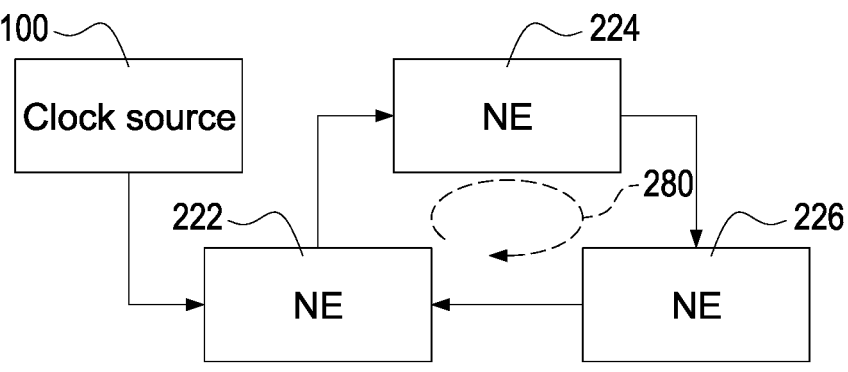
FIG. 1 is a block diagram illustrating an example of a plurality of network devices forming a timing loop in the Ethernet.
Figure 2:
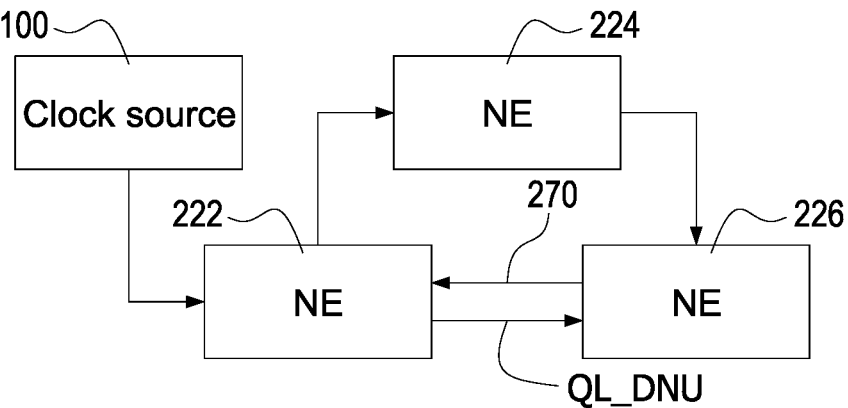
FIG. 2 is a block diagram illustrating an example of signal transmission for preventing forming the timing loop of FIG. 1.

Reference will now be made in detail to the present embodiments of the disclosure, examples of which are illustrated in the accompanying drawings. Wherever possible, the same reference numbers are used in the drawings and the description to refer to the same or like parts.

Figures 3, 4:
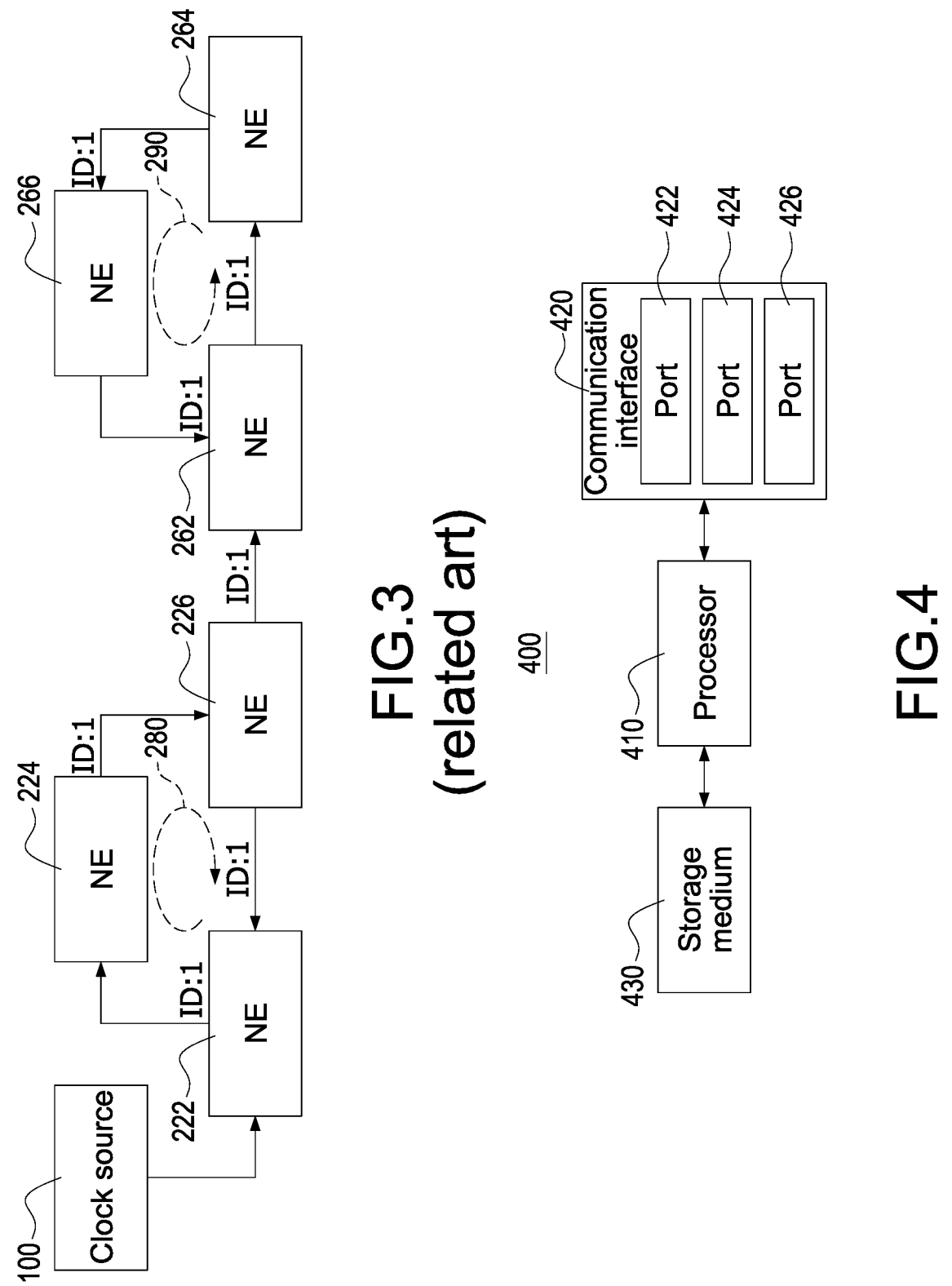
FIG. 3 is a block diagram illustrating an example of a plurality of network devices forming the timing loop in the Ethernet.
FIG. 4 is a block diagram illustrating an example network device according to one embodiment of the present disclosure.

Reference is made to FIG. 4. FIG. 4 is a block diagram illustrating an example network device according to one embodiment of the present disclosure. The network device 400 provided in the present disclosure executes the method of preventing the timing loop and the problem of the timing loop is eliminated.

The network device 400 of FIG. 4 includes a processor 410, a communication interface 420, and a storage medium 430. The processor 410 is connected to the communication interface 420 and the storage medium 430. The communication interface 420 includes a plurality of ports 422, 424, and 426. In one embodiment, the network device 400 exchanges packets through the ports 422, 424, and 426 with other network devices (not shown in the figure). The ports 422, 424, and 426 may respectively receive or transmit packets. when the ports 422, 424, and 426 receive packets, the ports 422, 424, and 426 act as the inputs of the network device 400. When the ports 422, 424, and 426 transmit packets, the ports 422, 424, and 426 act as outputs of the network device 400. In other words, whether the port property of the communication interface 420 should be considered as the input or the output depends on the actual transmission behavior, and it is not limited to a specific physical port and a fixed input port or output port.

In one embodiment, when the communication interface 420 is considered to include two inputs and one output (e.g., the ports 422, 424 act as two inputs and the port 426 acts as one output), the timing loop may occur. Accordingly, the technical features of the present disclosure are provided to prevent the problem.

In one embodiment, the network device 400 is not limited to the network devices, the routers, or the switches that support Layer 2 and/or Layer 3 in the networking system.

In one embodiment, the processor 410 may be but is not limited to the central processing unit (CPU), the system on chip (SoC), the processor for specific applications, the audio processor, the digital signal processor, the processing chip, or the controller for specific functions.

In one embodiment, the communication interface 420 may be but is not limited to an interface complied with Global System for Mobile communication (GSM), Long Term Evolution (LTE), 5th generation mobile networks, Worldwide interoperability for Microwave Access (WiMAX), Wireless Fidelity (Wi-Fi), IEEE 802.11, Bluetooth, or wired network communication interface.

In one embodiment, storage medium 430 may be but is not limited to the random access memory (RAM), the nonvolatile memory (such as the flash memory), the read-only memory (ROM), the hard disk drive (HDD), the solid-state drive (SSD), or the optical storage.

Figure 5:
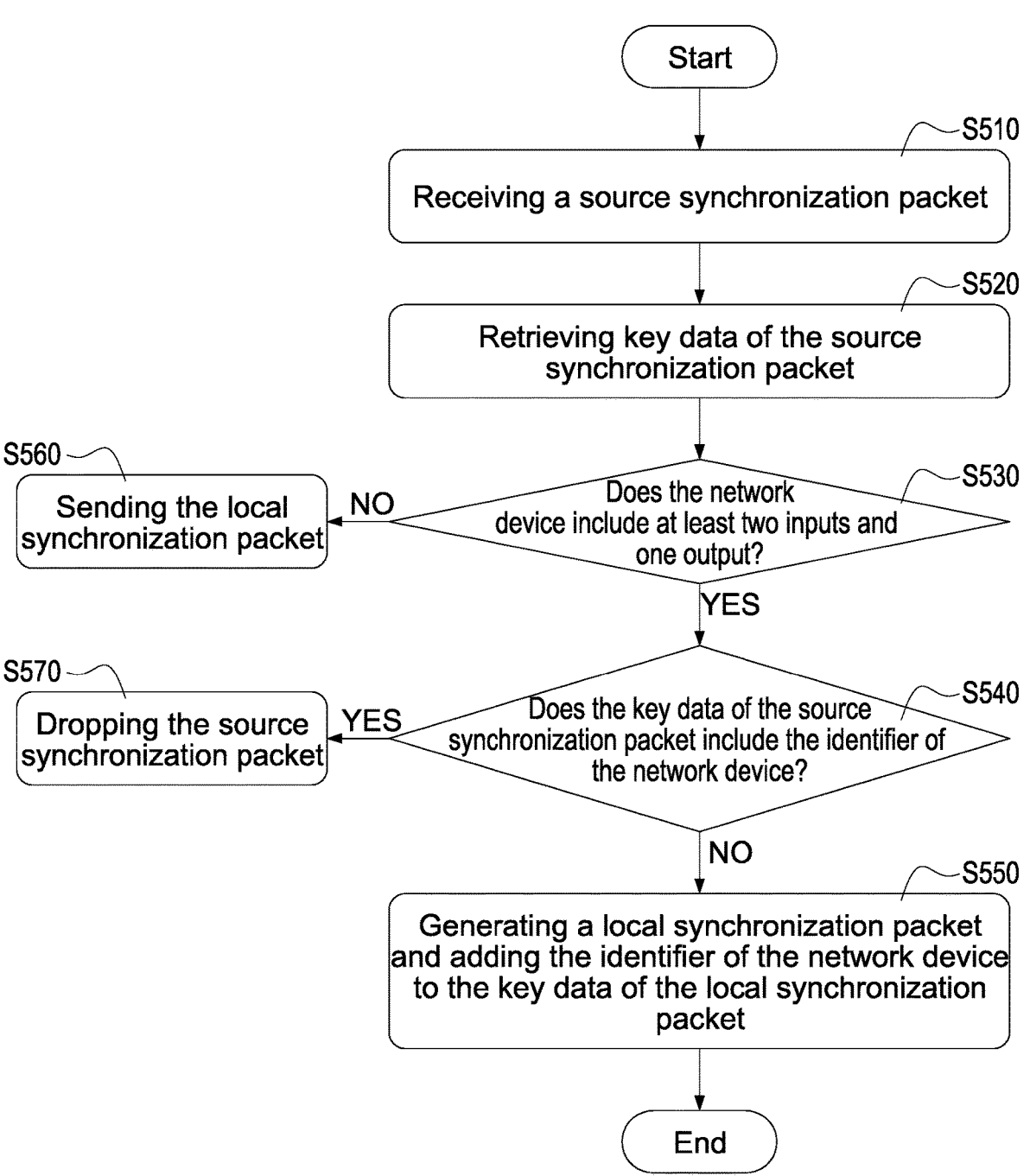
FIG. 5 illustrates a flow diagram of a method of preventing the timing loop according to one embodiment of the present disclosure.

For the sake of showing the network device 400 and the method of preventing the timing loop operated by the network device 400, the reference is made to FIG. 4 incorporated with FIG. 5. FIG. 5 illustrates a flow diagram of a method of preventing the timing loop according to one embodiment of the present disclosure.

In step S510, the network device 400 receives a source synchronization packet. In one embodiment, the source synchronization packet is the packet carrying the Primary Reference Time Clock (PRTC) or the Telecom Grandmaster (T-GM) defined by the standard organization ITU-T G.8272. In other embodiment, the source synchronization packet is the packet carrying the clock signal sent by other network devices.

In step S520, the network device 400 retrieves Key data of the source synchronization packet. In one embodiment, each network device 400 includes an identifier and the identifier represents the network device 400 itself. The identifier is generated randomly by the network device 400 itself and may be changed dynamically (it is noted that the identifier has to be the unique value among the network devices in the network). The identifier of the network device 400 and the Key data of the source synchronization packet may be any data format (such as numbers or texts). The Key data of the source synchronization packet corresponds to the identifier of the network device 400 that sends the source synchronization packet, so the following network device 400 that receives the source synchronization packet may determine whether the source synchronization packet is associated with itself.

In step S530, the network device 400 determines whether the communication interface 420 of the network device 400 itself includes at least two inputs and one output. In one embodiment, if at least two ports of the network device 400 respectively receive the packet and one port sends the packet, the determination is made that the network device 400 includes at least two inputs and one output.

When the network device 400 determines in step S530 that the network device 400 itself includes at least two inputs and one output, in step S540, the network device 400 determines whether the Key data of the source synchronization packet includes the identifier of the network device 400 itself.

In one embodiment, the purpose that the network device 400 determines whether the Key data of the received source synchronization packet includes the identifier of itself is to determine whether the clock source of the received source synchronization packet is associated with itself. Specifically, after the network device 400 receives the source synchronization packet, the source synchronization packet is decoded to retrieve the clock information and the Key data. Before using the clock information, the network device 400 has to determine whether the clock information causes the timing loop, so the network device 400 retrieves the Key data to determine whether the clock information is previously sent out by itself. If the network device 400 determines that the Key data does not include the identifier of the network device 400 itself in step S540, step S550 is performed. If the network device 400 determines that the Key includes the identifier of the network device 400 itself in step S540, step S570 is performed.

As described above, when the network device 400 determines in step S540 that the Key data of the source synchronization packet does not include the identifier of the network device 400 itself, it represents that the network device 400 has not yet used the clock signal to lock the local clock. In this scenario, step S550 is performed, where the network device 400 generates a local synchronization packet, adds the identifier of the network device 400 itself to the Key data of the local synchronization packet and sends the local synchronization packet through the output to another network device. In one embodiment, the network device 400 adds its identifier to the Key data of the source synchronization packet, the source synchronization packet being modified is then sent out as the local synchronization packet.

As described above, when the network device 400 determines in step S540 that the Key data of the source synchronization packet includes the identifier of the network device 400 itself, it represents that the network device 400 ever uses the clock signal to lock the local clock. In this scenario, the timing loop may occur if the network device 400 uses the clock signal again. Accordingly, in step S570, the network device 400 drops the source synchronization packet to prevent the timing loop.

As described above, when the network device 400 determines in step S530 that its communication interface 420 does not includes at least two inputs and one output, it represents that the timing loop problem does not occur on the network device 400 because the network device 400 does not include multiple inputs and not receive different signal from multiple clock sources. In this case, the network device 400 does not determine whether to add its identifier to the Key data. In step S560, the network device 400 sends the local synchronization packet through the output to another network device. In one embodiment, before the network device 400 sends the local synchronization packet to another network device, the network device 400 uses the clock signal of the received source synchronization packet to lock its local clock. In one embodiment, the network device 400 regards the source synchronization packet as the local synchronization packet and forwards the local synchronization packet through the output to another network device.

Figure 6:
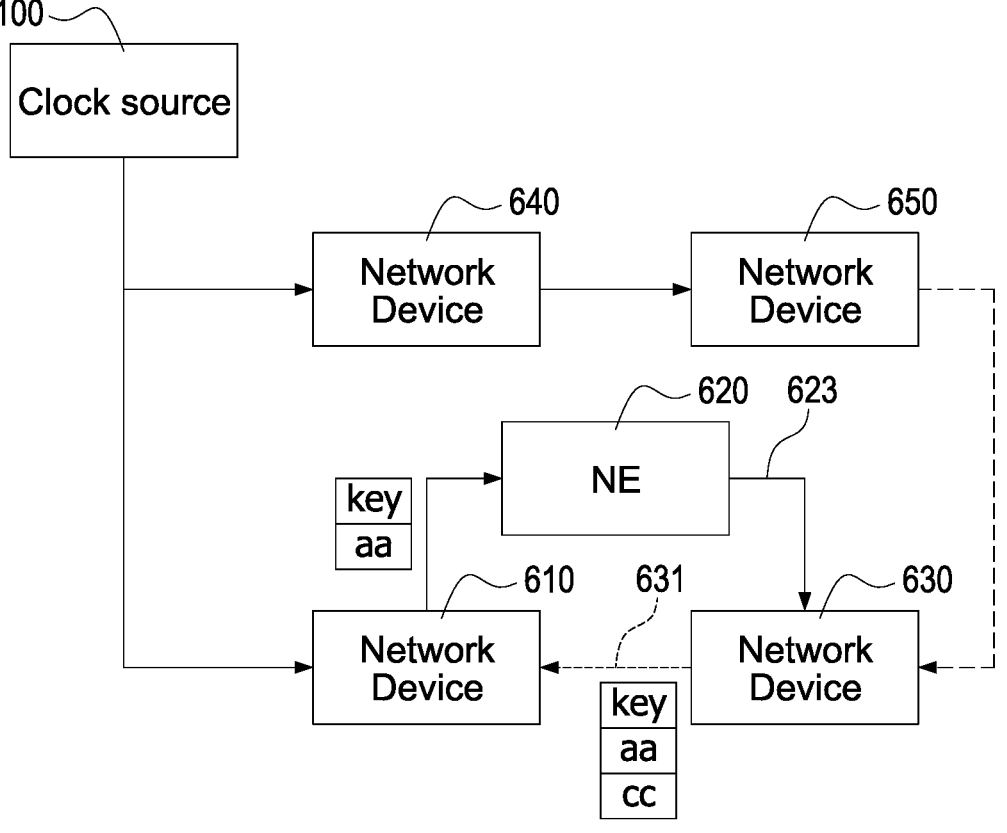
FIG. 6 illustrates an example architecture of the Ethernet according to one embodiment of the present disclosure.

Reference is made to FIG. 6. FIG. 6 illustrates an example architecture of the Ethernet according to one embodiment of the present disclosure. In the network architecture, the network devices 610 and 630 include two inputs and one output, and the network devices 620, 640, and 650 includes one input and one output. In the embodiment, the identifier of the network device 610 is "aa" and the identifier of the network device 630 is "cc".

The term "one hop" in the disclosure represents that the packet is sent through one path between adjacent nodes. For example, the packet is sent from clock source 100 to the network device 610 or the packet is sent from the clock source 100 to the network device 640. When the packet is sent from the clock source 100 to the network device 620, the hop number is two (two hops). For the sake of understanding, the following description is provided with an increasing order of the hop number of the packets.

In one embodiment, the network device 610 receives the source synchronization packet from the clock source 100. At this time, the Key data of the source synchronization packet may be a null value or the identifier of the clock source 100. If the network device 610 determines that the Key data of the source synchronization packet does not include its identifier "aa", the network device 610 generates the local synchronization packet based on the source synchronization packet, adds its identifier "aa" to the Key data of the local synchronization packet, and sends the local synchronization packet through the output. At this time, the Key data of the local synchronization packet is "Key:aa" as shown in FIG. 6.

In one embodiment, the network device 610 uses the clock signal of the source synchronization packet to lock its local clock. On the other hand, the network device 640 receives the source synchronization packet from the clock source 100. Because the network device 640 includes one input and one output, the network device 640 uses the clock signal of the source synchronization packet to lock its local clock, and the source synchronization packet is then sent as the local synchronization packet through the output.

In one embodiment, the network device 620 receives the source synchronization packet from the network device 610. It should be noted that the source synchronization packet received by the network device 620 is the local synchronization packet sent by the network device 610. Because the network device 620 includes one input and one output, the network device 620 uses the clock signal of the source synchronization packet to lock the local clock, takes the source synchronization packet as the local synchronization packet, and sends the local synchronization packet through the output. The Key data of the local synchronization packet sent by the network device 620 is still "Key:aa" shown in FIG. 6. Similarly, the network device 650 includes one input and one output. After the network device 650 receives the source synchronization packet from the network device 640, the network device 650 uses the clock signal of the source synchronization packet to lock its clock signal, and then sends the source synchronization packet as the local synchronization packet through the output.

In one embodiment, the network device 630 includes two inputs and one output. Two inputs respectively receive the source synchronization packets from the network devices 620 and 650. In the embodiment, the network device 630 chooses a link 623 to receive the source synchronization packet from the network device 620. In this scenario, the network device 630 drops the source synchronization packet that is sent from the network device 650 after receiving the source synchronization packet from the network device 650 (the dotted line between the network device 630 and the network device 650 in FIG. 6 represents the dropping of the source synchronization packet). The details of choosing one from a plurality of inputs in the method of preventing the timing loop is described below. Because the network device 630 includes two inputs and one output, after the network device 630 determines that the Key data of the source synchronization packet from the network device 620 does not includes the identifier of the network device 630, the network device 630 generates the local synchronization packet based on the source synchronization packet and adds its identifier "cc" to the Key data of the local synchronization packet. At this time, the Key data of the local synchronization packet sent by the network device 630 includes "Key:aa" and "Key:cc" as shown in FIG. 6.

The network device 610 then receives the source synchronization packet from the network device 630 and decodes the source synchronization packet to obtain the Key data of the source synchronization packet, wherein the Key data includes "Key:aa" and "Key:cc". At this time, the network device 610 compares the Key data with its identifier and gets the information that the Key data includes its identifier "aa". Therefore, the network device 610 does not choose the link 631 between the network device 610 and the network device 630, that is, the network device 610 drops the source synchronization packet sent from network device 630. Accordingly, all the network devices in the Ethernet can prevent the timing loop effectively.

Figure 7:
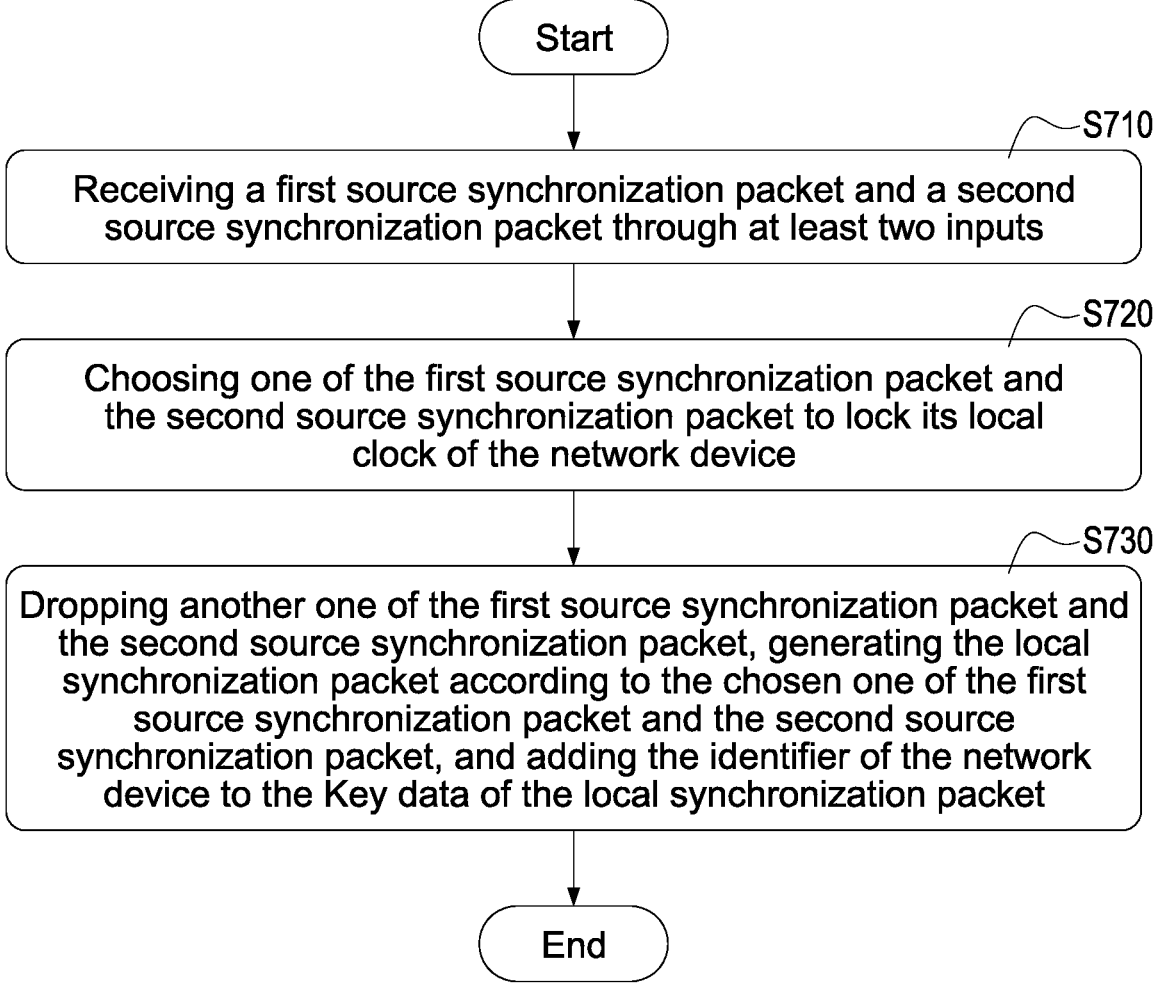
FIG. 7 illustrates a flow diagram of the method of preventing the timing loop according to another embodiment of the present disclosure.

Reference is made to FIG. 7. FIG. 7 illustrates a flow diagram of the method of preventing the timing loop according to another embodiment of the present disclosure. For the sake of understanding, the example method in FIG. 7 shows details of the network device 630 in FIG. 6 choosing the source synchronization packet from the network device 620 and dropping the source synchronization packet from the network device 650. It should be noted that the method illustrated in FIG. 7 can be executed by all network devices in the Ethernet without being limited to a specific network device (such as the network device 630 in FIG. 6).

In step S710, the network device 630 respectively receives a first source synchronization packet and a second source synchronization packet through at least two inputs. Following the embodiment described above, the network device 630 respectively receives the local synchronization packet sent by the network device 620 and the local synchronization packet sent by the network device 650, wherein the local synchronization packet sent by the network device 620 is used as the first source synchronization packet and the local synchronization packet set by the network device 650 is used as the second source synchronization packet.

In step S720, the network device 630 chooses one of the first source synchronization packet and the second source synchronization packet to lock its local clock. In one embodiment, the network device 630 chooses from the source synchronization packet of the network device 620 and the source synchronization packet of the network device 650 and respectively determines whether the Key data of the source synchronization packets includes the identifier "cc" of the network device 630.

In one embodiment, when the network device 630 determines that both the Key data of the first source synchronization packet and the Key data of the second source synchronization packet do not include its identifier, the network device 630 randomly chooses one of the first source synchronization packet and the second source synchronization packet or chooses one of the first source synchronization packet and the second source synchronization packet according to the order of receiving the first source synchronization packet and the second source synchronization packet. Therefore, the network device 630 locks the local clock of the network device 630 by the chosen one. For example, the priority of choosing the link 623 between the network device 630 and the network device 620 and the priority of choosing the link (not numbered) between the network device 630 and the network device 650 is the same for the network device 630 as shown in FIG. 6. In the embodiment, the network device 630 randomly chooses one source, e.g., the link 623 between the network device 630 and the network device 620, and the source synchronization packet of the network device 620 is chosen.

In step S730, the network device 630 drops another one of the first source synchronization packet and the second source synchronization packet, generates the local synchronization packet according to the chosen one of the first source synchronization packet and the second source synchronization packet, and adds the identifier of the network device 630 to the Key data of the local synchronization packet.

Following the embodiment described above, the network device 630 drops the packet received from another link in FIG. 6, that is, the network device 630 drops the source synchronization packet from the network device 650. The network device 630 generates the local synchronization packet based on the chosen source synchronization packet and adds its identifier to the Key data of the local synchronization packet, such that the Key data of the local synchronization packet received by the network device 610 through the output of the network device 630 includes "Key:cc". In one embodiment, the network device 630 uses the source synchronization packet from the network device 620 to lock its local clock.

Figure 8:
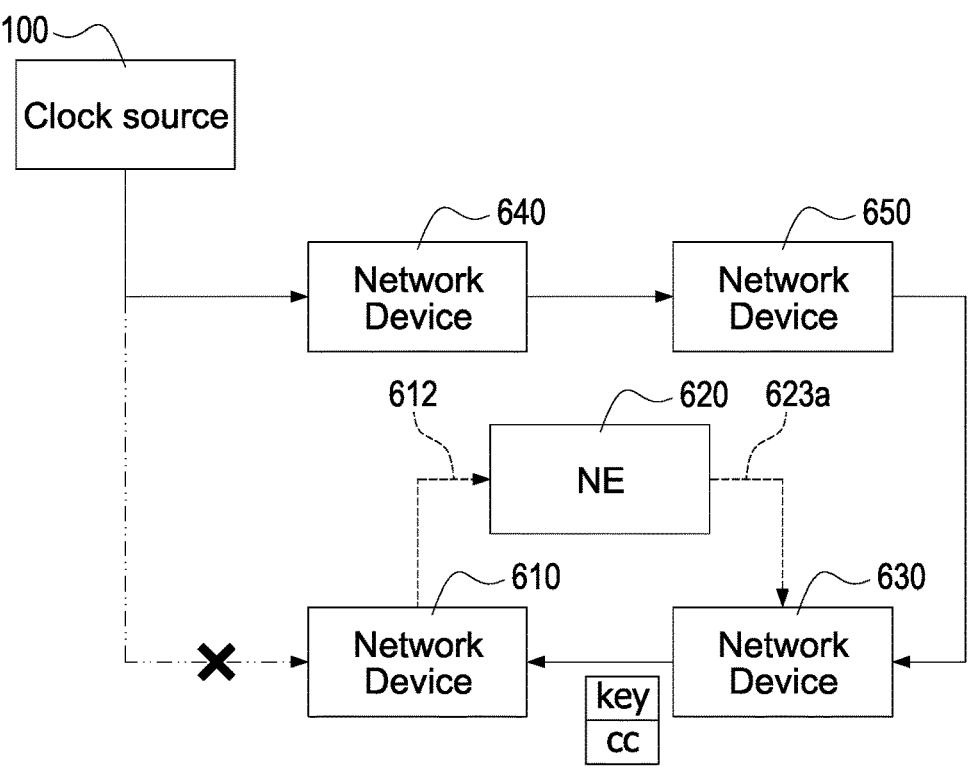
FIG. 8 illustrates an example architecture of the Ethernet according to one embodiment of the present disclosure.

Reference is made to FIG. 8. FIG. 8 illustrates an example architecture of the Ethernet according to one embodiment of the present disclosure. Compared with FIG. 6 that the network device 610 receives the source synchronization packet from the clock source 100, the network device 610 in FIG. 8 stops receiving the source synchronization packet from the clock source 100, so that the clock signal cannot be synchronized correctly. The reason that the network device 610 stops receiving the source synchronization packet from the clock source 100 may be the network disconnected or the satellite signal disappeared between the network device 610 and the clock source 100. At this time, the network device 610 switches to a holdover mode and sends, through the link 612, the local synchronization packet carrying synchronous mode information to the network device 620. The synchronous mode of the network device 620 is switched to the holdover mode due to the synchronous mode information, and the network device 620 sends, through the link 623a, the local synchronization packet carrying the synchronous mode information that indicates the holdover mode to the network device 630. The holdover mode is defined in the ITU standard and not described herein.

In the scenario that the network device 610 disconnects with the clock source 100, the network device 610 includes only one input and one output, so that the network device 610 does not add its identifier to the generated local synchronization packet.

In the embodiment shown in FIG. 6, the network device 630 uses the source synchronization packet (e.g., the first source synchronization packet) from the network device 620 to lock its local clock. In the embodiment shown in FIG. 8, after the network device 630 receives the synchronous mode information indicating the holdover mode from the network device 620, the network device 630 gets the information of the inaccuracy of the clock signal from the network device 620. In this case, the network device 630 switches over from the source synchronization packet (e.g., the first source synchronization packet) of the network device 620 to the source synchronization packet (e.g., the second source synchronization packet) of the network device 650 to lock its local clock.

The network device 630 shown in FIG. 8 includes two inputs and one output, so the network device 630 adds its identifier "cc" to the Key data of the generated local synchronization packet, such that the Key data of the source synchronization packet received by the network device 610 from the network device 630 includes "Key:cc".

Figure 9:
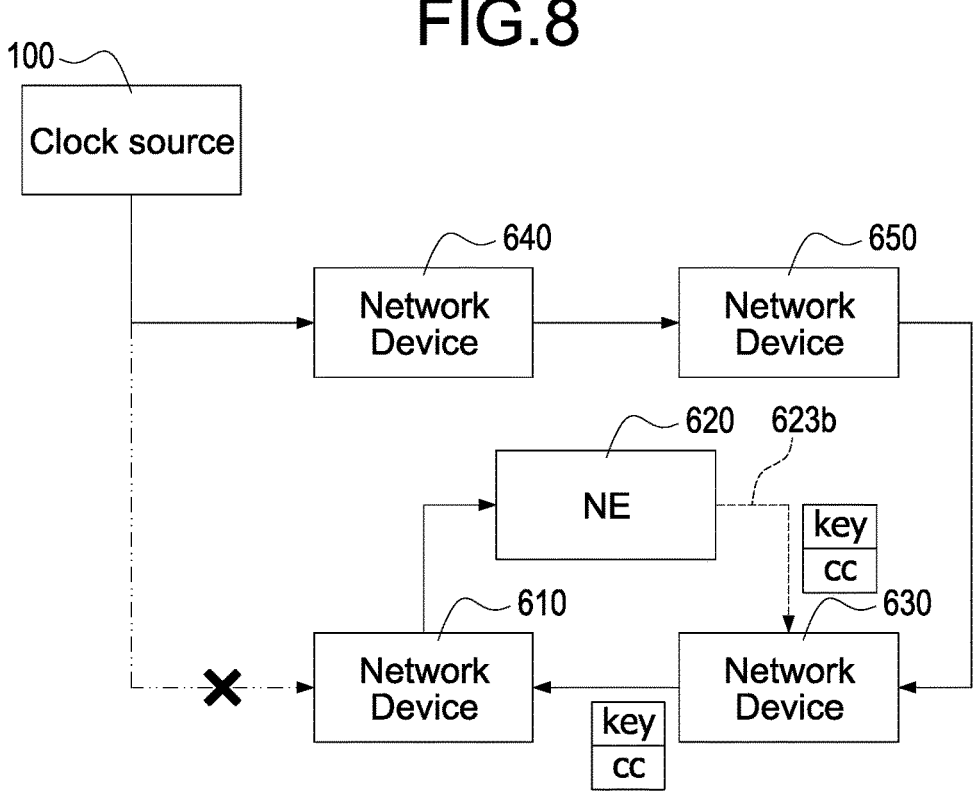
FIG. 9 illustrates an example architecture of the Ethernet according to one embodiment of the present disclosure.

Reference is made to FIG. 9. FIG. 9 illustrates an example architecture of the Ethernet according to one embodiment of the present disclosure. FIG. 9 shows the embodiment follows the embodiment of FIG. 8 in the time series. Following the embodiment described above, the network device 610 loses the correct clock source and is at the holdover mode. After receiving the source synchronization packet from the network device 630, the network device 610 switches from the holdover mode to a lock mode, that is, the network device 610 uses the clock signal of the source synchronization packet from the network device 630 to lock its local clock, transforms the source synchronization packet into the local synchronization packet, and sends the local synchronization packet to the network device 620. The Key data of the local synchronization packet generated and sent by the network device 630 includes the identifier "cc" of the network device 630. Because the network device 610 only includes one input and one output at this time, the network device 610 does not add its identifier to the generated local synchronization packet.

After the network device 620 receives the source synchronization packet from the network device 610, the mode of the network device 620 changes from the holdover mode to the lock mode, and then the network device 620 uses the clock signal of the source synchronization packet from the network device 610 to lock its local clock. The network device 620 transforms the source synchronization packet to the local synchronization packet and sends the local synchronization packet through the link 623b to the network device 630. The Key data of the local synchronization packet generated by the network device 620 includes the identifier "cc" of the network device 630.

After the network device 630 receives the source synchronization packet from the network device 620 and decodes the source synchronization packet, the Key data of the source synchronization packet is retrieved, and then the network device 630 determines that the Key data includes the identifier of the network device 630. Accordingly, the network device 630 does not choose the link 623b between the network device 620 and the network device 630, that is, the network device 630 drops the source synchronization packet from the network device 620 to prevent the timing loop problem.

Accordingly, even if the connection between the network device in the Ethernet and the clock source 100 is disconnected, the present disclosure supports the network devices in the Ethernet to automatically adjust and choose the clock source on the basis of preventing the timing loop, such that the clock of all the network devices maintains synchronousness and correctness.

Figure 10:
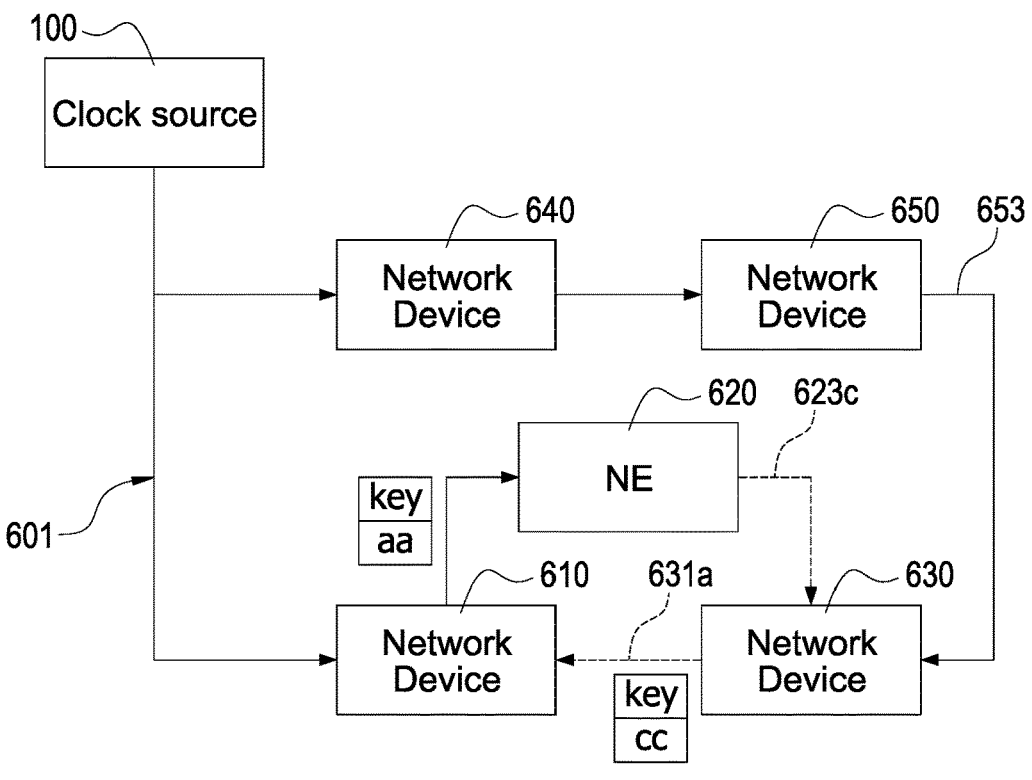
FIG. 10 illustrates an example architecture of the Ethernet according to one embodiment of the present disclosure.

Reference is made to FIG. 10. FIG. 10 illustrates an example architecture of the Ethernet according to one embodiment of the present disclosure. Compared with FIG. 6 that the network device 630 uses the source synchronization packet from the network device 620 to lock its local clock (i.e., the network device 630 chooses the link 623), the network device 630 in FIG. 10 uses the source synchronization packet from the network device 650 to lock its local clock, that is, the network device 630 chooses the link 653 between the network device 630 and the network device 650.

Like the description in FIG. 6, the network device 610 and the network device 640 respectively receive the source synchronization packet from the clock source 100 and use the source synchronization packet to lock their local clocks. The network device 610 sends the local synchronization packet to the network device 620, and the local synchronization packet includes the Key data "Key:aa". The network device 640 sends the local synchronization packet to the network device 650. The network device 620 uses the source synchronization packet from the network device 610 to lock its local clock, and the network device 650 uses the source synchronization packet from the network device 640 to lock its local clock.

In the embodiment in FIG. 10, the network device 630 chooses the link 653 between the network device 630 and the network device 650, so the network device 630 uses the source synchronization packet from the network device 650 to lock its local clock and drops the source synchronization packet from the network device 620 (i.e., not choosing the link 623c).

The network device 630 includes two inputs and one output. After the network device 630 generates the local synchronization packet based on the source synchronization packet from the network device 650, the network device 630 adds its identifier to the Key data of the local synchronization packet, i.e., "Key:cc" shown in FIG. 10. In the embodiment, a potential timing loop may exist among the network devices 610, 620, and 630, but the network device 610 prevents the timing loop by choosing the link 601 between the network device 610 and the clock source 100 instead of the link 631a between the network device 610 and the network device 630.

Figure 11:
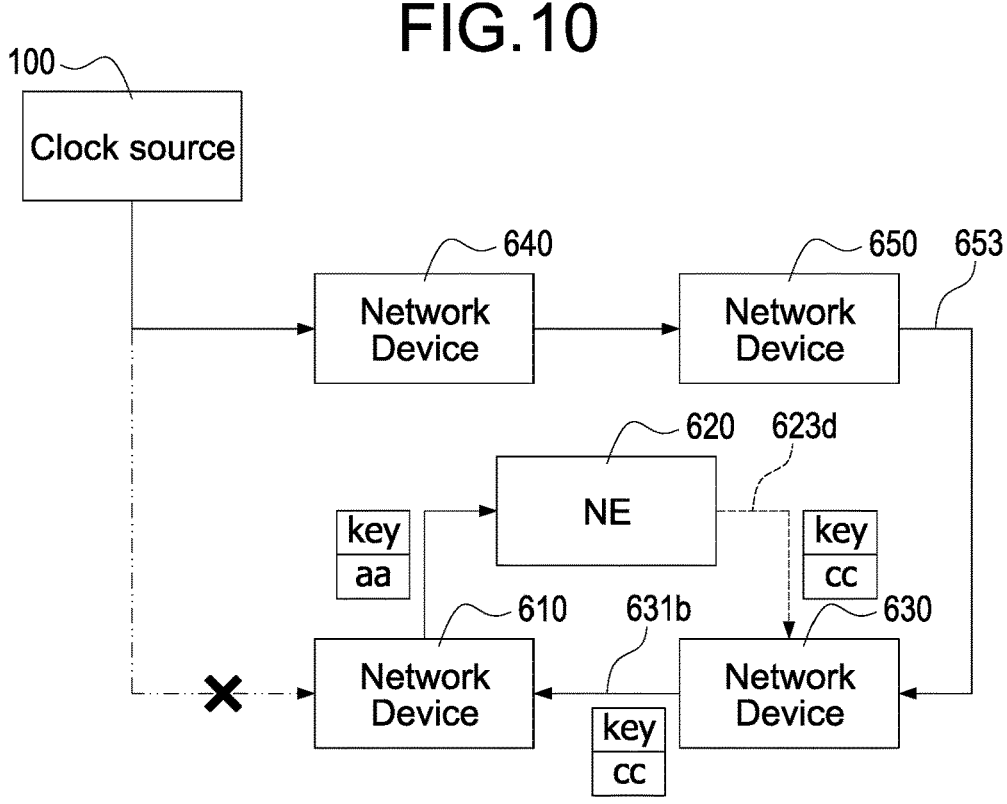
FIG. 11 illustrates an example architecture of the Ethernet according to one embodiment of the present disclosure.

Reference is made to FIG. 11. FIG. 11 illustrates an example architecture of the Ethernet according to one embodiment of the present disclosure. Compared with FIG. 10 that the network device 610 receives the source synchronization packet from the clock source 100, the network device 610 in FIG. 11 stops receiving the source synchronization packet from the clock source 100, so the clock signal cannot be synchronized correctly. The network device 610 then chooses the link 631b and uses the source synchronization packet from the network device 630 to perform the clock synchronization.

Similar to the description of FIGS. 8-9 above, the network device 610 in FIG. 11 uses the source synchronization packet from the network device 630 to lock its local clock. In the embodiment, the network device 630 includes two inputs and one output. The network device 630 respectively receives the source synchronization packets from the network devices 620 and 650. Because the Key data of the source synchronization packet received, through the link 623d, by the network device 630 includes the identifier of the network device 630, the network device 630 does not choose the link 623d and chooses the link 653 instead to prevent the timing loop.

In one embodiment, if the clock source 100 in FIG. 6 or FIG. 10 disappears (such as the power failure), neither the network device 610 nor the network device 640 receives the signal from the clock source 100. At this time, both the network device 610 and the network device 640 that directly receive signals from the clock source 100 switch to the holdover mode. The network device 610 then uses the source synchronization packet from the network device 630 to lock its local clock; however, it is a temporary condition.

After a short while, all the network devices 610 to 650 adjust to be the holdover mode until any one of the network devices receives a new clock source (and it is not limited to the clock source 100). It is the temporary condition that the network device 610 uses the source synchronization packet from the network device 630 as described above, and the local synchronization packet generated by the network device 630 is not used continuously by the other network devices, so the incorrect clock synchronization is prevented. Accordingly, the present disclosure provides the solution to prevent the timing loop as well as to Currently prevent incorrect clock synchronization when the signal of the clock source 100 disappears from the network.

In one embodiment, the storage medium 430 in FIG. 4 is a non-transitory computer-readable storage medium configured to store multiple program codes. The program codes are loaded into the processor 410 in FIG. 4, and the processor 410 executes the program codes and performs steps of FIG. 5 and FIG. 7.

As described above, the network device and the method of preventing the timing loop provided in the present disclosure may store the plurality of records, i.e., the Key data, in the source synchronization packet, and the network device including at least two inputs and one output adds its identifier to the Key data. When any potential timing loop forms in the Ethernet, the network device may compare the Key data of the source synchronization packet with its identifier to automatically avoid choosing the link transmitting the source synchronization packet to prevent the timing loop problem. Accordingly, even if the network topology changes in the Ethernet, each network device applying the method of the present disclosure may automatically detect and prevent the timing loop without any human intervention (e.g., the administrator). Furthermore, the Key data of the source synchronization packet may store the plurality of data, and the present disclosure may correctly detect and prevent the timing loop in the large-scale Ethernet.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method of preventing timing loop, comprising:
   receiving a source synchronization packet by a network device;
   retrieving key data of the source synchronization packet;
   in case the network device comprises at least two inputs and one output, determining whether the key data of the source synchronization packet includes an identifier of the network device;
   generating a first local synchronization packet and adding the identifier of the network device to the key data of the first local synchronization packet when determining that the key data of the source synchronization packet does not include the identifier;
   in case the network device comprises one input and one output, generating a second local synchronization packet based on the source synchronization packet, wherein key data of the second local synchronization packet does not include the identifier of the network device; and
   sending the first local synchronization packet or the second local synchronization packet through the output.

2. The method of preventing timing loop of claim 1, further comprising:
   dropping the source synchronization packet when determining that the key data of the source synchronization packet includes the identifier.

3. The method of preventing timing loop of claim 1, wherein after determining that the key data of the source synchronization packet does not include the identifier, the method further comprises:
   locking a local clock of the network device by using the source synchronization packet.

4. The method of preventing timing loop of claim 1, further comprising:
   receiving a first source synchronization packet and a second source synchronization packet through the at least two inputs; and
   generating the first local synchronization packet according to one of the first source synchronization packet and the second source synchronization packet and adding the identifier of the network device to the key data of the local synchronization packet.

5. A network device, comprising:
   a communication interface, configured to receive a source synchronization packet; and
   a processor, connected with the communication interface, wherein the processor is configured to:
   retrieve key data of the source synchronization packet;
   in case the network device comprises at least two inputs and one output, determine whether the key data of the source synchronization packet includes an identifier of the network device;
   generate a first local synchronization packet and add the identifier of the network device to the key data of the first local synchronization packet when determining that the key data of the source synchronization packet does not include the identifier;
   in case the network device comprises one input and one output, generating a second local synchronization packet based on the source synchronization packet, wherein key data of the second local synchronization packet does not include the identifier of the network device; and
   send the first local synchronization packet or the second local synchronization packet through the output.

6. The network device of claim 5, wherein the processor is configured to drop the source synchronization packet when determining that the key data of the source synchronization packet includes the identifier.

7. The network device of claim 5, wherein the processor is configured to lock a local clock of the network device by using the source synchronization packet when determining that the key data of the source synchronization packet does not include the identifier.

8. The network device of claim 5, wherein the communication interface is configured to receive a first source synchronization packet and a second source synchronization packet through the at least two inputs; and the processor is configured to generate the first local synchronization packet according to one of the first source synchronization packet and the second source synchronization packet and add the identifier of the network device to the key data of the local synchronization packet.

9. The network device of claim 8, wherein the processor is configured to, after choosing the first source synchronization packet to lock the local clock of the network device, send the first local synchronization packet with synchronous mode information through the output when stopping receiving the first source synchronization packet, wherein the synchronous mode information indicates a holdover mode, and the processor is configured to send the first local synchronization packet with the synchronous mode information indicating the holdover mode.

10. The network device of claim 8, wherein the processor is configured to, after choosing the first source synchronization packet from the first source synchronization packet and the second source synchronization packet to lock the local clock of the network device, switch over to choose the second source synchronization packet from the first source synchronization packet and the second source synchronization packet to lock the local clock of the network device when the first source synchronization packet is received with synchronous mode information indicating a holdover mode.

* * * * *